US008566648B2

(12) United States Patent
Schroeder

(10) Patent No.: US 8,566,648 B2
(45) Date of Patent: Oct. 22, 2013

(54) AUTOMATED TESTING ON DEVICES

(75) Inventor: Jason A. Schroeder, Los Angeles, CA (US)

(73) Assignee: salesforce, inc., San Francisco, CA (US)

( * ) Notice: Subject to any disclaimer, the term of this patent is extended or adjusted under 35 U.S.C. 154(b) by 315 days.

(21) Appl. No.: 13/104,784

(22) Filed: May 10, 2011

(65) Prior Publication Data

US 2012/0198279 A1  Aug. 2, 2012

Related U.S. Application Data

(60) Provisional application No. 61/438,856, filed on Feb. 2, 2011.

(51) Int. Cl.
*G06F 11/00* (2006.01)

(52) U.S. Cl.
USPC .................. 714/38.14; 717/124; 717/137

(58) Field of Classification Search
USPC ................. 714/32, 38.1, 38.14; 717/124, 137
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Yolanda L Wilson
(74) *Attorney, Agent, or Firm* — Weaver Austin Villeneuve & Sampson LLP

(57) ABSTRACT

Disclosed herein are techniques for testing a device. In some implementations, a request to perform a test instruction on one or more of a plurality of computing devices is received at a server. The test instruction may be configured to test an application or capability associated with the one or more computing devices. The test instruction may be written in accordance with a computer programming language capable of being translated into a plurality of different programming language instructions sets. A first computing device may be selected from the plurality of computing devices. The first computing device may be capable of performing instructions written in a first one of the computer programming language instruction sets. The test instruction may be transmitted to the first computing device via the network. A response message may be received from the first computing device.

24 Claims, 7 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,698,011 B1 * | 2/2004 | Reinders et al. ............... 717/124 |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,287,190 B2 * | 10/2007 | Rosenman et al. ............. 714/32 |
| 7,299,451 B2 * | 11/2007 | Dygon et al. ................. 717/124 |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0131285 A1 * | 7/2003 | Beardsley et al. ............... 714/38 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153774 A1 * | 8/2004 | Gavish et al. ................... 714/25 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0240841 A1 * | 10/2005 | Lin ............................. 714/724 |
| 2007/0256058 A1 * | 11/2007 | Marfatia et al. ............. 717/137 |
| 2008/0216060 A1 * | 9/2008 | Vargas ......................... 717/137 |
| 2008/0249972 A1 | 10/2008 | Dillon |
| 2009/0063415 A1 | 3/2009 | Chatfield et al. |
| 2012/0290407 A1 | 11/2012 | Hubbard et al. |

* cited by examiner

AUTOMATED TESTING ON DEVICES

PRIORITY AND RELATED APPLICATION DATA

This application claims priority to Provisional U.S. Patent Application No. 61/438,856, filed on Feb. 2, 2011, entitled "Methods and Systems for Automated Testing on Mobile Smartphones and Tablets," by Jason Schroeder, which is incorporated herein by reference in its entirety and for all purposes.

TECHNICAL FIELD

The present disclosure relates generally to on-demand services provided over a data network such as the Internet, and more specifically to testing services and applications at a mobile device.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them. At least some on-demand services may be accessible via mobile devices.

BRIEF DESCRIPTION OF THE DRAWINGS

The included drawings are for illustrative purposes and serve only to provide examples of possible structures and process steps for the disclosed inventive systems and methods for testing services and applications at mobile devices. These drawings in no way limit any changes in form and detail that may be made to implementations by one skilled in the art without departing from the spirit and scope of the disclosure.

DETAILED DESCRIPTION

Figure 1:
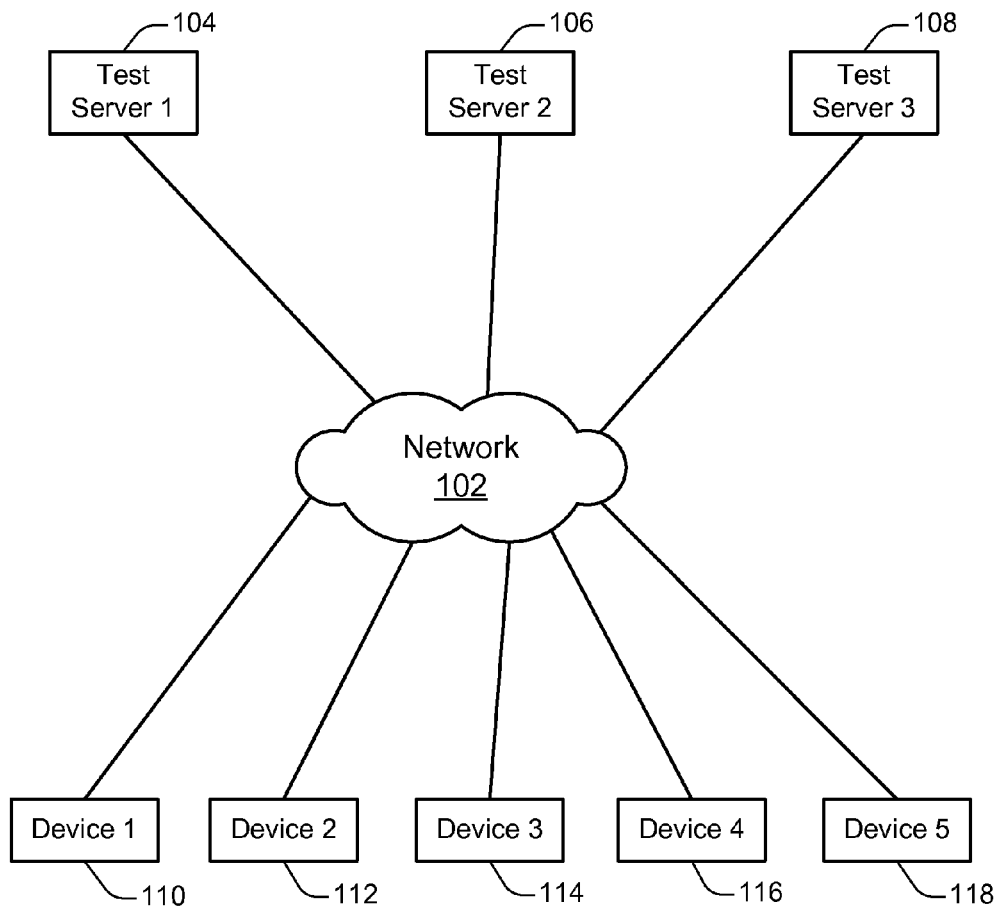
FIG. 1 shows a system diagram of a system 100 for testing applications and services at mobile devices, performed in accordance with one implementation.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

Software developers are increasingly developing software applications for a variety of computing platforms. In the traditional laptop and personal computer market space, the number of operating systems and computing platforms is relatively limited. In contrast, the mobile computing device market includes devices configured in accordance with a variety of computing platforms. For instance, the operating systems that run today's mobile devices include Nokia's® Symbian®, Google's Android®, Apple's® iOS®, RIM's® BlackBerry OS®, Microsoft's® Windows Phone®, Linux®, Palm/HP's® WebOS®, Samsung's® Bada®, Nokia's® Maemo® and MeeGo®, and many others. These operating systems run on devices produced by a variety of manufacturers, and the devices have varying hardware and software capabilities.

Many applications designed for mobile devices are web-based. Web-based applications may be designed to run on a variety of mobile and/or non-mobile devices that can communicate via a network such as the Internet. Web-based applications may be designed to be platform-generic, capable of running on different devices having different hardware and/or software configurations. However, different devices may vary in how web-based applications are accessed. For example, different devices may run different web browsers, potentially resulting in differences in how a web page is rendered on different mobile devices. As another example, different devices may have different screen sizes, screen resolutions, user input mechanisms, and other hardware capabilities. As yet another example, different devices may or may not be configured to execute JavaScript®, run Flash® applications, display Portable Document Format (PDF) files, or implement other software functionality (e.g., video codecs, audio codecs, software plugins, media capabilities).

Many other applications designed for mobile devices are native software applications or are hybrid web/native software applications. These hybrid or native software applications may be platform-specific, written to utilize the capabilities and instruction sets of a particular device platform. Platform-specific applications may be written in accordance with a programming language and programming language instruction set capable of being implemented on a particular platform. For example, an application written for the Google®Android® operating system may be written in Java and may include programming language instructions specific to Android® for accessing hardware capabilities of the mobile device such as touch sensing or GPS.

As companies move into developing platform-specific software applications, testing them is increasingly difficult. Software applications may be run in part over a network such as the Internet and may be run on a variety of devices that vary in both hardware and software. These differences may result in significant variations of application behavior between different hardware and/or software platforms. For example, variations between devices may result in differences based on factors such as the brand and model of hardware device, the operating system installed on the device, the screen resolution of the device, and the internal capabilities of the mobile browser installed on the device.

To facilitate cross-platform device testing, in some implementations, a custom "test runner" application may be run on a device. The test runner application can behave much like a thin client. The test runner may be configured to receive and implement test requests from a test server. The test runner may be configured to perform actions and retrieve parameters at a mobile device. The test runner may be include supporting code configured to embed and/or manipulate a web view.

Different hardware and/or software environments can have different hardware capabilities and different software instructions that may be called to use those capabilities. In some implementations, tests may be composed in a programming language that is agnostic to the hardware and/or software configuration of the device on which the test is to run. The platform-agnostic test may be stored on a storage medium accessible to the test server. The platform-agnostic test may then be sent to a test runner application on a device. The test runner application may be written for the particular platform on which it is running. The test runner application may translate the platform-agnostic test provided by the server to platform-specific instructions in a platform-specific instruction set that can be performed on the device platform. In some implementations, tests may include various types of instructions.

In some implementations, the test runner application may support platform-agnostic instructions that may be translated by the test runner application to platform specific instructions. In a first example, an instruction may cause a key to be pressed at the device. In a second example, an instruction may capture an image such as a screenshot at the device. In a third example, an image captured at the device may be posted to a URL. In a fourth example, an application may be launched at the device. In a fifth example, an application may be installed at the device. In a sixth example, a script such as a Lua® script may be retrieved from a URL. In a seventh example, a script such as a Lua® script may be executed. In an eighth example, system parameters such as free memory (e.g., disk, RAM) or radio signal strength (e.g., 3G, 4G, Wi-Fi) may be measured. In a ninth example, a touch event such as "touch down," "touch up," or "touch tap" may be performed. In a tenth example, a touch gesture such as "swipe" or "pinch/zoom" may be performed.

In some implementations, one type of test instruction may perform an action on a device. If the device fails to perform the instruction, then an error may be reported. For example, one instruction may instruct the device to load a particular URL, with a timeout window of 20 seconds. This instruction may be written in a form such as: "testrunner.browser.loadUrl ('http://www.salesforce.com/', 20);". As another example, one instruction may instruct the device to simulate a touch event at a point x=20, y=30 in the browser's coordinate system. This instruction may be written in a form such as: "testrunner.input.simulateTap (20, 30);".

In some implementations, another type of test instruction may assert that a particular condition or state on the device is true. If the condition is not true, then an error may be reported. For example, one instruction may instruct the device to assert that the document.title field within the document object model (DOM) for a webpage is set to the value 'CRM—salesforce.com.'. This instruction may be written in a form such as: "testrunner.browser.assertJavascriptEval ("document.title=='CRM—salesforce.com'", "title didn't match expected text");".

In some implementations, yet another type of instruction may compare an image or image portion displayed on the device against a known test image. Performing an image comparison may, for instance, help catch rendering errors that may not appear in the DOM of a page. For example, one instruction may search the image displayed on the screen of the display device to locate the presence of a test image "salesforceLogo." If the test image is not present, then an error may be reported. This instruction may be written in a form such as "testrunner.browser.assertImageMatch(salesforceLogo, 'cannot find logo on the screen');".

In some implementations, image recognition failures can be corrected as passing behavior when viewing the test results webpage. For example, a captured image may be accepted as an additional passing image. As another example, a captured image could replace the existing known good bitmaps, allowing for easy test updates during changes such as branding modifications.

In some implementations, a test server may have a test runner dispatcher. The test runner dispatcher allows a test run to be queued on a particular set of devices. The test run may specify a particular test or tests to execute. The test run may also specify one or more criteria for executing a test, such as the operating system version, browser version, device manufacturer and model. For example, a test run may indicate information such as "Run Testing Suite for salesforce.com on iPhone® 3GS, iPhone® 4, and iPad®." As another example, a test run may indicate information such as "Run Testing Suite for Chatter.com on all BlackBerry® smartphones with touch screens."

In some implementations, new devices may be easily added to the test system. A new device may be powered on and connected with a network. Then, the test runner application may be installed on the device, and the test runner application may be directed to a test server hostname. Next, the device may self-register with the test server, providing information such as the device manufacturer, the device model, and the device operating system. In some cases, the test runner application may be able to provide other information, such as whether the device has hardware support for touch sensing, global positioning system (GPS) information, and other features.

In some implementations, facilitating the easy addition of new devices may allow the pool of testing devices to be greatly increased for long-running tests. Also, new device models and operating systems may be quickly supported. In some implementations, testing devices may need little maintenance. For example, a power cord, a network connection, and an installed test runner application may be sufficient.

FIG. 1 shows a system diagram of a system 100 for testing applications and services at mobile devices, performed in accordance with one implementation. In some implementations, the system 100 may facilitate testing of applications and services provided to mobile devices that may have different hardware and software configurations.

The system 100 includes a network 102, test servers 104-108, and devices 110-118. In some implementations, a system for testing applications or services at mobile devices may include any number of test servers or devices in communication via a network.

In some implementations, one or more of the test servers 104-108 may be configured to facilitate testing of the devices 110-118. A method for initiating a test at a device is discussed with respect to FIG. 3.

In some implementations, one or more of the test servers 104-108 may be implemented at a device configured to provide on-demand computing services, such as the app server 588. Alternately, or additionally, one or more of the test servers 104-108 may be implemented at a device configured to provide services internal to the service provider.

Figure 6:
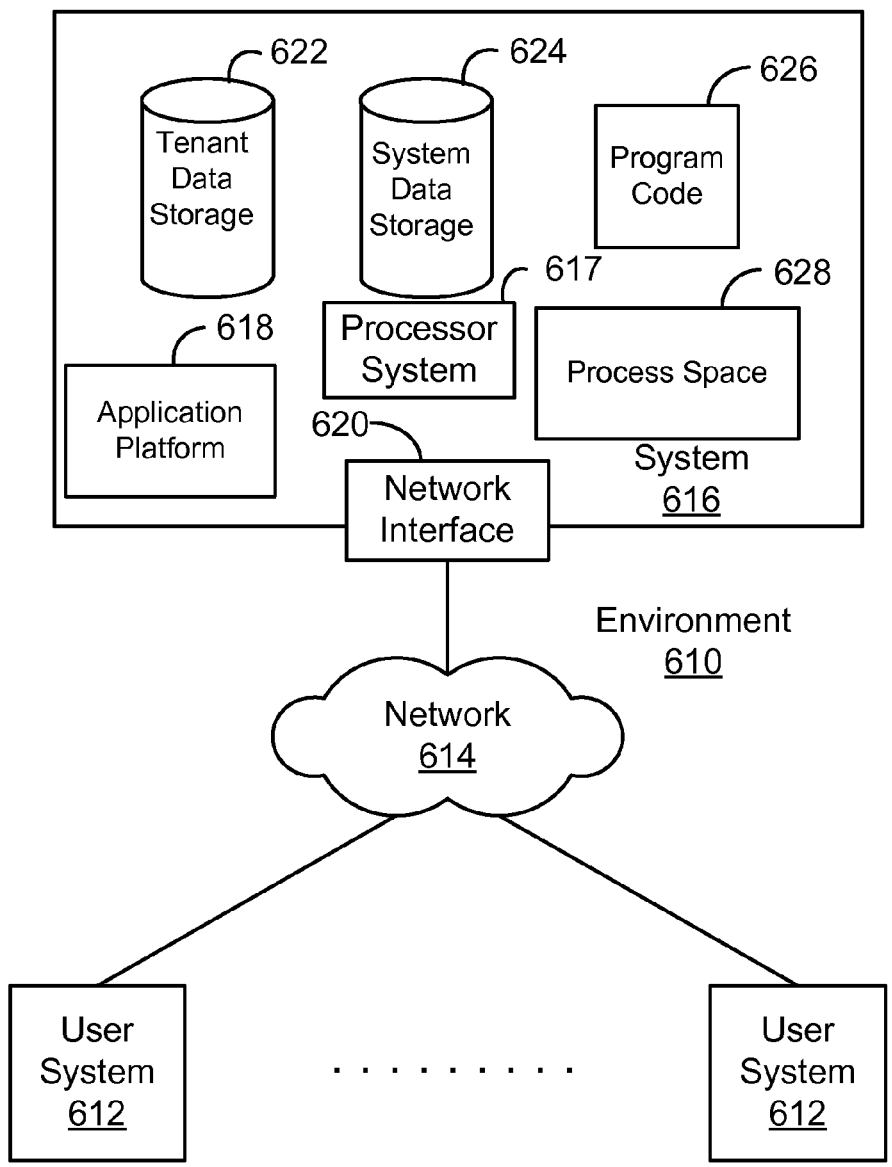
FIG. 6 shows a system diagram 610 illustrating the architecture of a multitenant database environment, in accordance with one implementation.
Figure 7:
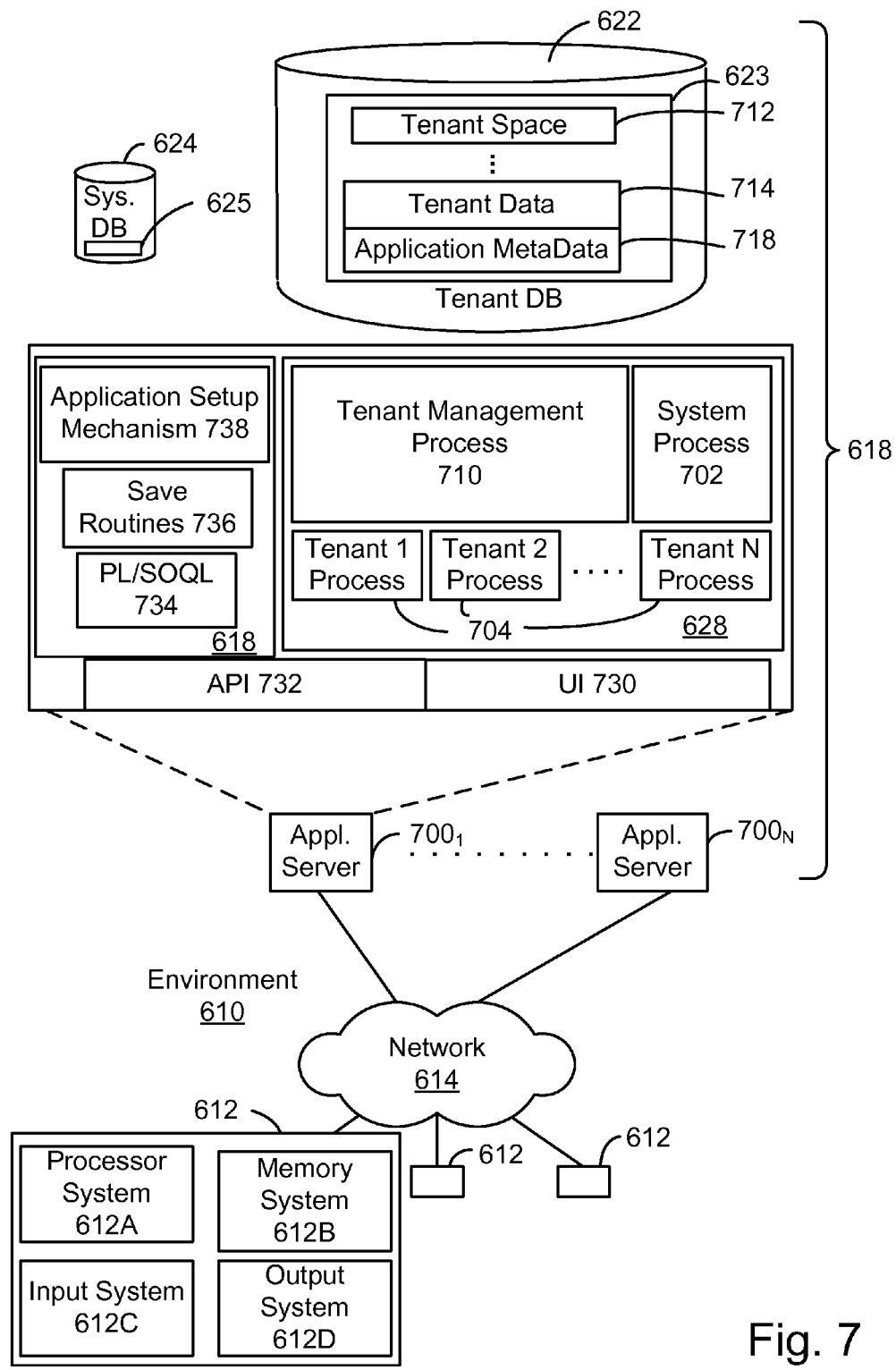
FIG. 7 shows a system diagram 610 further illustrating the architecture of a multitenant database environment, in accordance with one implementation.

In some implementations, data associated with the test servers 104-108 may be stored in a multitenant database system, such as those discussed with respect to FIGS. 6 and 7. Alternately, or additionally, data may be stored via a different storage mechanism.

In some implementations, a test may be platform-specific. For example, a test may be written for a particular hardware device, for hardware devices created by a particular vendor, for a particular operating system, for a particular operating system version, or for any other specific hardware and/or software platform configuration.

In some implementations, a test may not be platform-specific. For example, a test may include operations, such as accessing a web page, that may be performed by devices of many different platforms.

In some implementations, a test may be specified in a programming language such as Lua, JavaScript®, or Java®. A test runner application may be installed on a testing device. The test runner application may translate operations specified in the original programming language to instructions that can be understood within the context of the platform of the testing device. For example, a test may include an operation specified in Lua indicating that a particular key press should be performed. However, the particular instructions needed to implement this operation may vary between devices of different platforms. Thus, when this test is performed by a device having a specific platform, the test runner may translate the specified key press operation to one or more instructions in an instruction set specific to the device platform associated with the device. That is, the test runner may translate the platform-agnostic key press instruction into an instruction for performing the key press in a computer programming language format that is understood by the specific platform of the mobile device.

In some implementations, the network 102 may be entirely private to the service provider. For example, the network 102 may facilitate private testing of mobile devices by the service provider, and both the devices 110-118 and the test servers 104-106 may be controlled by the service provider. In this case, the network 102 could include a secure corporate network as well as any other communication network components needed to communicate with the devices 110-118.

In some implementations, the network 102 may include public portions. For example, one or more of the devices 110-118 may communicate with a test server via a communication network such as 3G or 4G provided by a mobile network provider. As another example, one or more of the devices 110-118 may communicate with a test server via a public network such as the Internet.

In some implementations, the devices 110-118 may be configured to perform tests in accordance with the direction of a test server. A method for performing a test at a device is discussed with respect to FIG. 4.

In some implementations, the devices 110-118 may be controlled by the service provider. For example, the devices 110-118 could be used by the service provider for private testing and could be configured to communicate over the public network portion in order to test an application or service as accessed over such a public network or communication medium.

In some implementations, the devices 110-118 may be controlled by an entity external to the service provider. For example, the service provider may provide test servers for device vendors, application vendors, or third party developers to test mobile devices.

In some implementations, one or more of the devices 110-118 may be configured with a test runner application. Configuration of a device for testing is discussed with respect to the method 200 shown in FIG. 2.

In some implementations, one or more of the devices 110-118 may be configured with applications provided by the service provider. For instance, an application provided by the service provider may be installed during the configuration method discussed in FIG. 2.

In some implementations, one or more of the devices 110-118 may be configured with applications not provided by the service provider. For instance, a device may be configured with one or more web browsers, phone software, e-mail software, other communication software, personal information management software (e.g., for address book contacts, tasks, calendar events, etc.) an operating system, or any other software provided by an entity other than the service provider. As another example, a device may be configured with software provided by a third party entity (e.g., other than the service provider and phone manufacturer), such as the Opera Mini web browser available from Opera Software ASA, opera.com.

In some implementations, one or more of the devices 110-118 may be physical devices. For instance, a device may be a mobile phone, a tablet computer, a laptop, a PC, or any other such device.

In some implementations, one or more of the devices 110-118 may be virtual devices. For example, a particular hardware and/or software configuration for a physical device may be simulated in software. Simulated devices may be located on the same physical machine or on different physical machines.

In some implementations, one or more of the devices 110-118 may be dedicated for testing purposes. For example, the devices 110-118 may be connected to the network 102 and left in a designated testing room so that they are generally available for testing.

In some implementations, one or more of the devices 110-118 may be used for purposes other than testing. For example, one or more of the devices 110-118 may be used by developers to develop applications as well as being used for testing purposes. In this case, tests may be run concurrently with the alternate usage, or the tests may be run when a device is not otherwise in use. For instance, a device may be made available for testing at night when it is not in use by developers.

Figure 2:
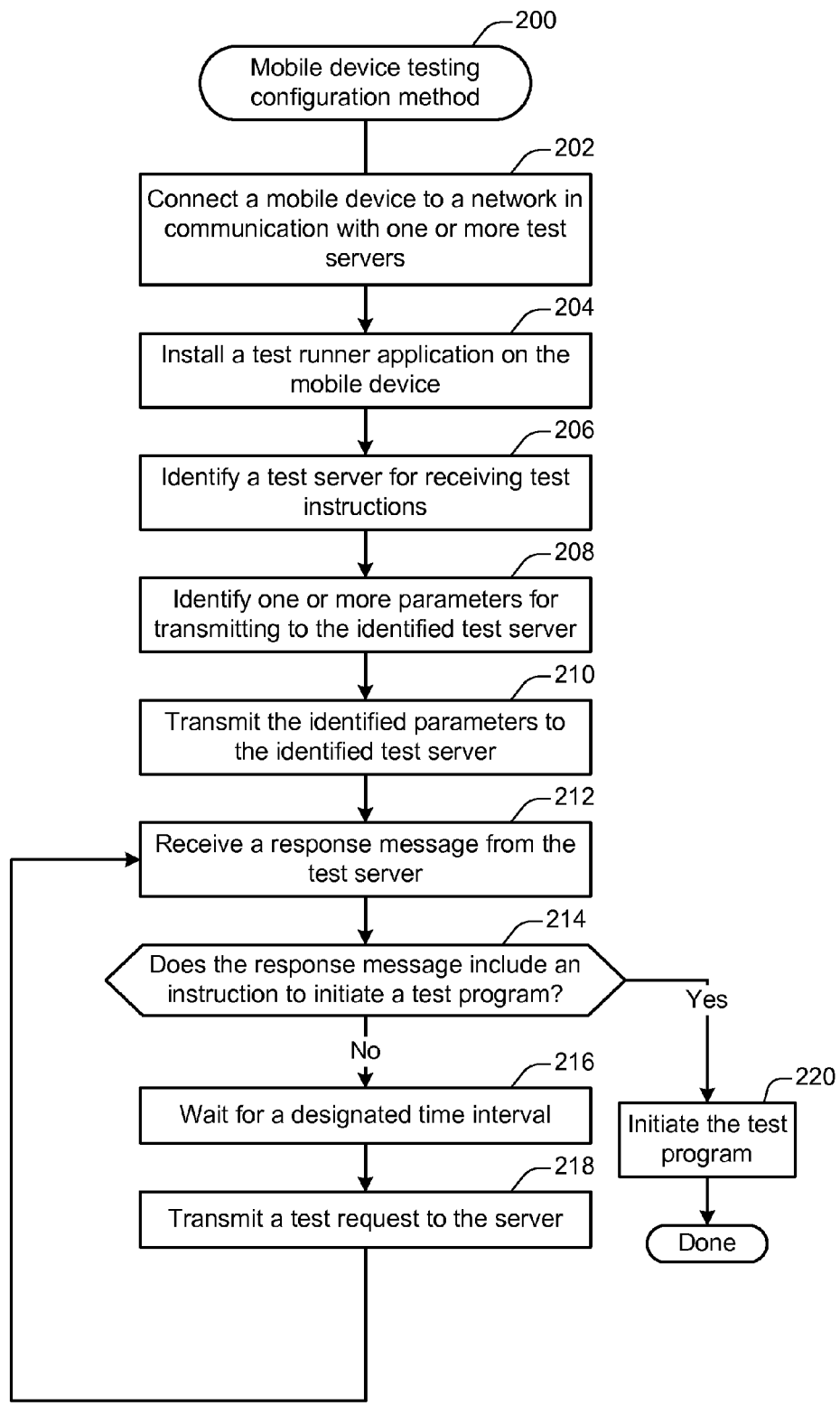
FIG. 2 shows a flow diagram of a method 200 for configuring a mobile device for testing, performed in accordance with one implementation.

FIG. 2 shows a flow diagram of a method 200 for configuring a mobile device for testing, performed in accordance with one implementation. In some implementations, the method 200 may be initiated when a mobile device is activated. The method 200 may be used to install a test runner application, initiate communications with a test server, and receive an instruction to initiate a test program.

In some implementations, the method 200 may be initiated automatically. For example, an application installed on the mobile device may be configured to initiate the method 200 in order to test the application itself and/or other capabilities of the mobile device. In this way, an application may be made capable of self-testing.

In some implementations, the method 200 may be initiated manually. For example, a user may perform operations such as connecting the mobile device to a network, installing the test runner application on the mobile device, and identifying a test server for receiving test instructions. In this way, a user may quickly configure a mobile device for testing.

At 202, a mobile device is connected to a network. The network is in communication with one or more test servers. In some implementations, the mobile device discussed in FIG. 2 may include any of the devices 110-118 shown in FIG. 1. The mobile device may be a physical device or a virtual device.

Although the device referred to in the method 200 is referred to as a mobile device, in some implementations other types of devices may also be used. For example, the method 200 may be used to configure any type of device that is compatible with the testing framework techniques discussed herein.

In some implementations, a mobile device may be automatically connected with a network when the mobile device is activated. Alternately, an affirmative action to connect the mobile device to a network may be taken.

In some implementations, a mobile device may connect with only one network, such as a 4G phone network. Alternately, a mobile device may connect with more than one network, such as a 3G phone network and a Wi-Fi® network. If more than one network is available, then the mobile device may connect with each network or with only a selected one or more of the available networks.

The types of network standards that may be used may include, but are not limited to: Ethernet, Wi-Fi®, 3G®, 4G®, Edge®, Bluetooth®, Wi-Fi® IEEE 802.11, and infrared communication standards. The types of networks that may be used may include, but are not limited to, private networks, public networks, the Internet, the World Wide Web, local area networks (LANs), wide area networks (WANs), metropolitan area networks (MANs), personal area networks (PANs), and backbone networks.

At 204, a test runner application is installed on the mobile device. In some implementations, the test runner application may be received over the network. For example, the test runner application may be downloaded from a website, a mobile application directory, or other network location.

In some implementations, the test runner application may be installed from a storage device. For example, the test runner application may be installed from a flash storage device (e.g., a microSD card, a USB hard drive). As another example, the test runner application may be installed by receiving an instruction from a computer (e.g., a desktop, a laptop) connected with the mobile device (e.g., via a USB connection). The computer may have an application installed that transfers and installs the test runner application on the connected mobile device.

In some implementations, the test runner application may function as a thin client. The test runner application may be configured to send and receive communications with a test server. Further, the test runner application may be configured to implement test instructions received from the server.

In some implementations, the test runner application may be configured to translate one or more test instructions from the server. The test instructions may be written in a platform-agnostic programming language. The test runner application may be configured to translate these platform-agnostic test instructions to test instructions that may be implemented on the mobile device at which the test runner application is installed. Thus, the test runner application may include platform-specific elements and act as a bridge between the platform-agnostic test framework of the server and the specific hardware and/or software platform associated with the mobile device on which the test runner application is installed. For example, the test runner application may be configured to receive test instructions written in a programming language such as Lua®, JavaScript®, or any other programming language. Then, the test runner application may be configured to translate the received test instructions into an instruction set specific to the mobile device platform of the device on which the test runner application is installed. In some implementations, translating the received test instructions may include interpreting the test instructions via an interpreter capable of running on the platform on which the test instructions are performed.

Figure 4:
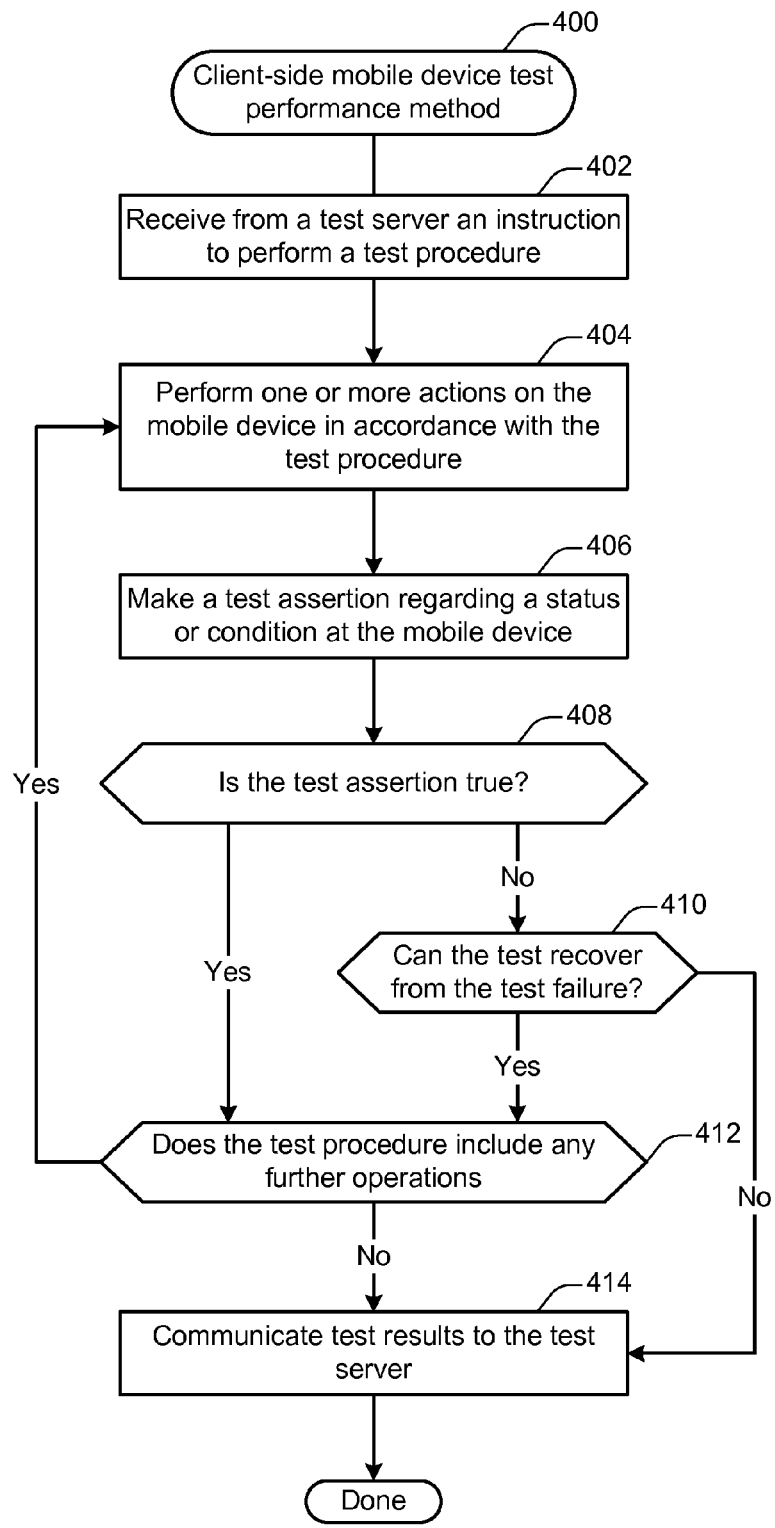
FIG. 4 shows a flow diagram of a method 400 for performing a client-side mobile device test, in accordance with one implementation.

In some implementations, the test runner application may be operable to conduct one or more of the other operations shown in FIGS. 2 and 4. For example, the test runner application may be configured to perform any of operations 206-220 shown in FIG. 2. As another example, the test runner application may be configured to perform any of the operations 402-414 shown in FIG. 4.

In some implementations, the test runner application may be written in a programming language that can be executed by the mobile device. Thus, the programming language in which the test runner application is written may vary based on the device platform. For example, a test runner application written for devices configured to run Microsoft® Windows® Mobile® may be written in the C++ programming language. As another example, a test runner application written for devices configured to run an Android® operating system may be written in the Java®, C, or C++ programming languages. As yet another example, a test runner application written for devices configured to run a Mac OS operating system may be written in the C, C++, or Objective-C programming languages.

At 206, a test server for receiving test instructions is identified. In some implementations, the test server may be identified manually. For example, a user installing the test runner application may specify a hostname of a test server. The test server may be identified based on IP address, hostname, network location, URI, or any other identifier.

In some implementations, the test server may be identified automatically. For example, the test runner application may be configured to identify a test server network address. As another example, a test server network address may be specified by a network location when the test runner application is installed at operation 204. As yet another example, a test runner application may be configured to communicate with a test server portal that instructs the test runner application as to which test server or servers the test runner application should communicate with.

In some implementations, more than one test server may be identified. In this case, the device may perform operations 206-220 for more than one test server. A device may communicate with more than one test server, for instance, in an effort to balance test loads between different servers and/or increase the number of devices available for each test server. For example, one test server may not have any test requests pending for a device of the type corresponding to the mobile device in FIG. 2, while another test server may have such a test request pending. In some implementations, test requests may be sent to two different servers simultaneously. Alternately, only one test request may be sent to a server at a time, and a second test request may be sent to a different server when the test runner application is waiting for the first test server at operation 216.

In some implementations, a test server may provide a response to a mobile device to redirect the mobile device to a different test server. This type of redirect response may be used to load balance between test servers, to aid in auto-discovery, to deprecate a particular host server and migrate devices to a new host server, or to accomplish any other such objective.

At 208, one or more parameters for transmitting to the identified test server are identified. The parameters may include any information about the device that may be useful to the test server. For example, some test requests pending at the test server may apply only to devices for which certain parameters are met. A test may, for instance, seek to determine the behavior of a particular type of mobile device running a particular operating system version when the device has less than 25% battery life remaining.

In some implementations, the parameters may be specified by the test runner application. Alternately, or additionally, the test runner application may receive a message from the test server specifying parameters to identify and transmit. The parameters may be identified by retrieving status information from the device and/or by deducing secondary information from the retrieved status information.

The parameters that may be identified may include, but are not limited to the device platform (e.g., BlackBerry, iOS, Android), the device manufacturer, the operating system type, the operating system version, a device ID, the type of network used to communicate with the server, the types of networks supported by the device, the type of communication protocol used to communicate with the server, the types of communication protocols supported by the device, the types of networks available to the device (e.g., 3G, 4G, Wi-Fi), the current battery level, whether the device is currently connected to a permanent power source, the device screen size, the device screen resolution, an amount of free temporary memory available at the device, a total amount of temporary memory at the device, an amount of free long-term memory at the device, a total amount of long-term memory at the device, whether the device supports a particular input mechanism (e.g., touch, virtual keyboard, physical keyboard, navigation pad), whether the device supports a particular communication capability (e.g., GPS, text messaging), whether the device is a physical device or a simulated device, and a list of applications installed on the device.

At 210, the identified parameters are transmitted to the test server. In some implementations, the parameters may be transmitted via any available communication protocol. For example, the parameters may be transmitted via a communication protocol such as Hypertext Transfer Protocol (HTTP), Hypertext Transfer Protocol Secure (HTTPS), Secure Shell (SSH), File Transfer Protocol (FTP), Telnet, or any other communication protocol. In some implementations, the parameters may be transmitted according to the Representational State Transfer (REST) constraints or according to a different communication paradigm.

At 212, a response message is received from the test server. In some implementations, the response message may be received according to the communication technique used to transmit the parameters at operation 212. Alternately, a different type of communication technique may be used.

In some implementations, the response message may include various types of information. In a first example, the response message may acknowledge the receipt at the server of the parameters transmitted at operation 210. In a second example, the response message may include an instruction to initiate a test program. In a third example, the response may include an instruction to wait for a designated time period. In a fourth example, the response may include an instruction to terminate the test runner application. In a fifth example, the response may include a request to identify and transmit additional parameter values not transmitted at operation 210. In a sixth example, the response may include a request to re-identify and re-transmit parameters already transmitted at operation 210.

At 214, a determination is made as to whether the response message includes an instruction to initiate a test program. This determination may be made by analyzing the test message according to one or more criteria specified within the test runner application at the mobile device.

At 216, the test runner application may wait for a designated time period. Any time interval may be used, including a time interval on the order of seconds, minutes, hours, or days. In some implementations, the designated time interval may be a fixed interval, such as 10 minutes. However, a designated time interval may also be dynamically determined at run time.

In some implementations, the time period may be determined at the mobile device. For example, the test runner application may be configured to wait for a designated period of time if no test instruction is received. As another example, the test runner application may be configured to vary the designated time period based on factors such as the time of day or computing load at the mobile device.

In some implementations, the time period may be received at the mobile device in a message from the server. For example, the server may provide a designated time period that varies based on factors such as the time of day, the computing load at the server, and the quantity of tests pending at the server.

In some implementations, the test runner application may terminate if a response message from the server does not include an instruction to initiate a test program. For example, a test runner application may terminate after the first occurrence of such a condition, or may terminate after a designated number of response messages from the server fail to include an instruction to initiate a test program. As another example, a test runner application may terminate upon receiving an instruction to terminate from the server.

At 218, a test request is transmitted to the server. In some implementations, the test request may indicate that the device is prepared to receive and initiate a test program from the server.

In some implementations, the test request may include some or all of the parameters discussed with respect to operation 208. In some instances, the parameters transmitted may include all parameters previously transmitted, previously transmitted parameters that are capable of changing between successive communications with the server, and previously transmitted parameters that have actually changed since the most recent communication of those parameters to the server. For example, some parameters such as device manufacturer or screen size may not change between successive communications with the server. Accordingly, some parameter values may not be transmitted at 218. As another example, some parameters such as battery life and operating system version may change between successive communications with the server. Accordingly, these parameters may be re-identified and re-transmitted with the test request at 218.

At 220, the test program is initiated. In some implementations, more than one test program may be implemented. Techniques for initiating a test program are discussed with respect to FIG. 4.

In one example, a test program may verify that a focused field is the field that is expected. For instance, a test may verify that an "OK" button, not a "Cancel" button is the default field for a given dialog message.

In one example, a test program may verify that menu items are present under certain conditions. For instance, a test may verify that a "Login" menu item appears when the "username" and "password" fields are not empty, or that a "Logout" menu item appears only when the application is considered "logged in."

In one example, a test script may log parameters such as network signal strength or time of day in the event of a test failure. By logging such information, data may be aggregated and analyzed to search for recurring trends or patterns of problems.

In one example, a test script may perform one or more actions such as providing user input that may result in a change that is reflected on a mobile device, such as sending an e-mail to the smartphone from the server. Then, the test script may verify that the expected result has occurred. In addition, the test script may verify that certain fields (e.g., buttons, labels, icons) are displayed on the screen of the mobile device with the expected text or images.

Figure 3:
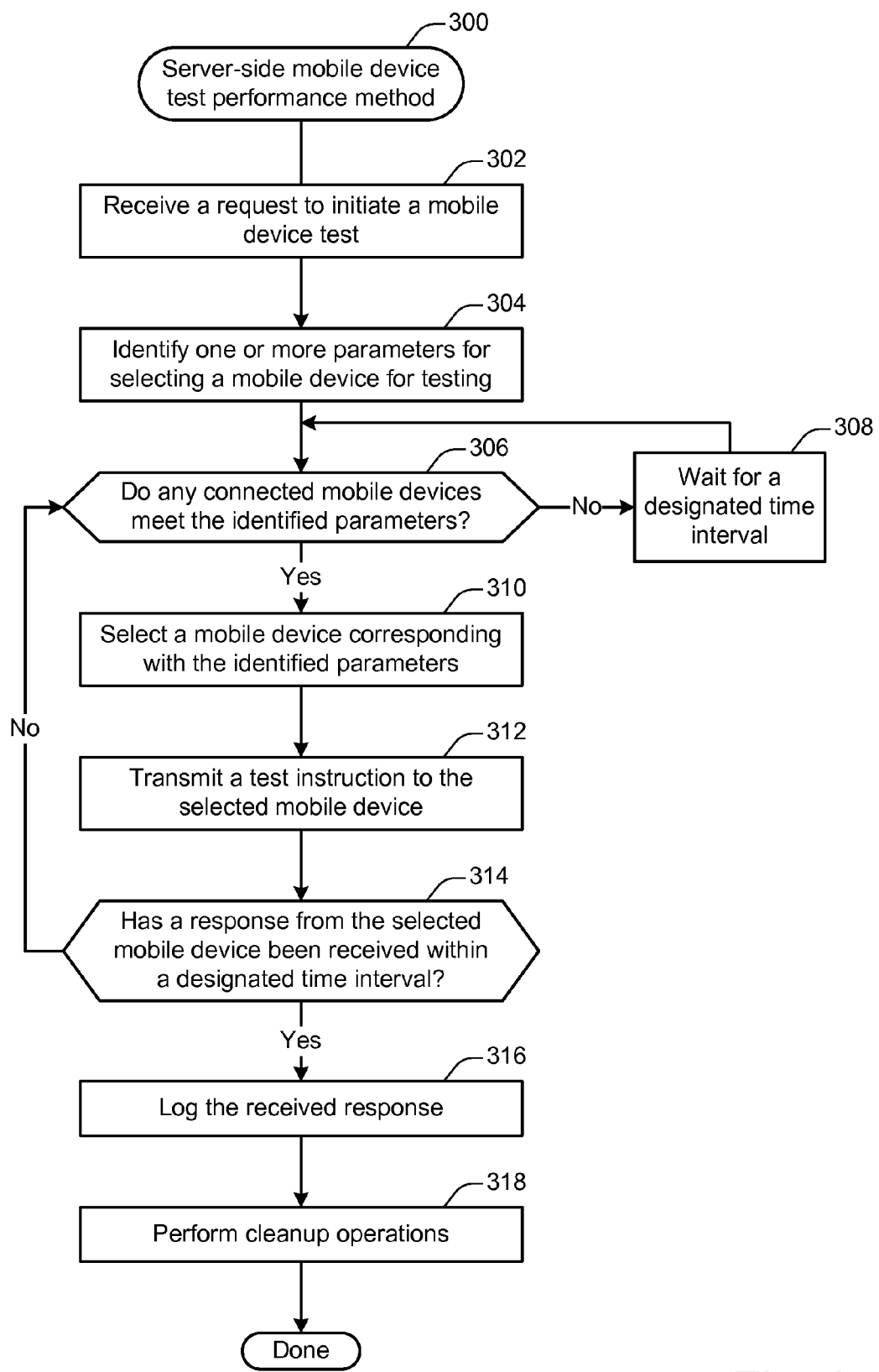
FIG. 3 shows a flow diagram of a method 300 for performing a server-side mobile device test, in accordance with one implementation.

FIG. 3 shows a flow diagram of a method 300 for performing a server-side mobile device test, in accordance with one implementation. In some implementations, the method 300 may be used to receive a request to perform a test, identify one or more mobile devices for performing the requested test, sending a message to initiate the requested test on the identified device, and logging the test result. In some implementations, the method 300 may be used in conjunction with the method 200 for configuring a mobile device and the method 400 for client-side mobile device test performance respectively.

Although the device referred to in the method 300 is referred to as a mobile device, in some implementations other types of devices may also be used. For example, the method 300 may be used to initiate a test on any type of device that is compatible with the testing framework techniques discussed herein.

At 302, a request to initiate a mobile device test is received. In some implementations, the request may specify a particular test to initiate. For example, the request may specify that a touch screen input test, a webpage access test, an image comparison test, or other type of test is to be performed. As another example, the request may specify a series of tests for a particular application or website, such as a test suite for testing functionality associated with a particular interactive website and associated applications.

In some implementations, a test request may specify a test of an application that may vary between devices. For example, an application may be made available for Windows Mobile® devices as well as Android® devices, and the two applications may be implemented using different code to reflect the platform differences between the two types of devices. In this case, the same test suite may be used for both applications, or the tests performed on the device or devices may vary between the two computing platforms. By implementing the test suite in a platform-agnostic programming languages, many tests should be applicable to devices of differing platforms. For example, the ability to load a web page may be common to most or all mobile devices with network access. However, some tests may not be applicable to certain platforms that lack the necessary capabilities for performing those tests. For example, only certain mobile devices may support touch input or GPS. As another example, some tests may require applications (e.g., an application being tested) to be installed on the mobile device.

At 304, one or more parameters for selecting a mobile device for testing are identified. In some implementations, any available parameters may be used, including any of the parameters identified by the mobile device at operation 208 in FIG. 2. In some instances, the parameters may be received along with the request to initiate the test at operation 302.

In some implementations, identifying parameters for selecting a mobile device for testing may allow the test server to initiate tests that only apply to particular devices. For example, a test that checks the functionality of an application with respect to touch-screen capabilities on a mobile device may not be applicable to devices that lack touch capabilities. As another example, a test that checks capabilities only found in the Android® operating system may not be applicable to devices that implement the Windows Mobile® operating system. Thus, the parameters identified at 304 may facilitate the selection of a device or devices to which a particular test is applicable. In one example, a test may be run at any Blackberry® mobile device with a track ball input mechanism. In another example, a test may be run at any mobile device with a screen resolution of at least 320×300 pixels and support for touch-based input.

In some implementations, the one or more parameters may specify that more than one device should be selected. In one example, a test may indicate that each available device that supports GPS should be tested. In another example, a test may indicate that each available device that implements the Windows Mobile® operating system should be tested. These types of multiple-device tests may help identify inconsistencies between devices as to the implementation of the tested capabilities.

At 306, a determination is made as to whether any of the mobile devices in communication with the server meet the identified parameters. The mobile devices compared at operation 306 may be the devices that have initiated communications with the server via the method 200 shown in FIG. 2. The parameters transmitted by these devices may be logged at the test server. Then, a comparison between the parameters identified at operation 304 and the parameters transmitted by the devices and stored at the test server may be performed.

At 308, the test server waits for a designated time period. In some implementations, the designated time interval may be fixed at, for example, 10 minutes. However, a designated time interval may also be strategically determined and/or vary at run time. For instance, the time period may vary based on factors such as the time of day or the number of tests pending at the server. Any time interval may be used, including a time interval on the order of seconds, minutes, hours, or days. After the designated time period has elapsed, the test server may again determine whether any connected mobile devices meet the identified parameters. In some implementations, a test may be flagged as incomplete and removed from the pool of pending tests if a designated time period or number of testing attempts has passed without identifying a device that meets the identified parameters. In some implementations, the test server may evaluate new devices that establish a connection with the test server to determine whether any of the new devices satisfy the parameters specified by a previously-received test instruction request.

At 310, a mobile device corresponding with the identified parameters is selected. If only one mobile device corresponding with the identified parameters is identified, then that device may be selected. If instead more than one mobile device corresponding with the identified parameters is identified, then various selection criteria may be used to select the mobile device. In a first example, a device with limited availability (e.g., a developer's device that is only available at night) may be selected. In a second example, a device that was not tested the previous time that the test was requested may be selected, so as to establish a more even distribution of tests among the test devices. In a third example, a daily recurring test may be distributed evenly among the devices that match the criteria so that each available matching device executes the test before any of the available matching devices are tested again. In a fourth example, a test may be run on every matching device, or on some portion of matching devices, to provide for a larger data set of test results.

In some implementations, more than one mobile device may be selected for performing the test. For example, a test may be run on more than one mobile device for additional redundancy. As another example, a test may be run on many similar mobile devices to identify differences between the devices. These differences may include, for instance, differences between versions of an operating system, differences between versions of a web browser, or differences between device models of a particular device manufacturer brand.

At 312, a test instruction is transmitted to the selected mobile device. In some implementations, the test may be transmitted via the same techniques for communicating between the mobile device and the server as discussed with respect to FIG. 2.

In some instances, the test transmitted may be relatively simple. For instance, the mobile device may be instructed to identify a parameter value such as the current battery life and transmit this information back to the server. In other instances, the test transmitted may be relatively complex. For example, the test instruction may include a collection of actions, assertions, image comparisons, control sequences (e.g., if, then, else, while, etc.), and communications with the server to be performed at the mobile device. A client-side mobile device test performance method is discussed with respect to FIG. 3.

In some implementations, the test instruction may be pushed to the mobile device. Alternately, the test server may wait until the mobile device polls the server for a test instruction as discussed with respect to operations 212-218 in FIG. 2. Then, the test server may transmit the test instruction to the mobile device in response to the polling request.

At 314, a determination is made as to whether a response from the selected mobile device has been received within a designated time interval. In some implementations, a fixed time interval such as 10 minutes may be used. In some instances, a time interval may vary based on the test. For example, some tests may require longer to complete than others, so some tests may be afforded a greater length of time to transmit a response.

In some implementations, if a response from the selected device is not received within the designated time interval, then the test may be flagged as incomplete. If a test is flagged as incomplete, then a different device may be selected for initiating the test. In some instances, the test may be retried on the same device. When a test is flagged as an incomplete, the result may be logged as discussed with respect to operation 316. If a test is repeatedly flagged as an incomplete on different devices, then this result may indicate a problem with the test rather than a problem with the various devices.

At 316, the received response is logged. In some implementations, when information is logged, it may be stored on a storage medium, transmitted in a message to a user or other server, or saved in some other way.

In some implementations, the information that is logged may include any information received from the device. This information may include, but is not limited to, parameter values (e.g., parameter values transmitted at operations 210 or 218), image captures, image comparison results, text messages, function return values, a time interval in which the test was completed, an amount of memory consumed during the test, an amount of memory in use before and after the test, and test results (e.g., assertion outcomes). Test results may indicate success or failure of the test as a whole as well as the outcomes of individual assertions within the test program.

At 318, one or more cleanup operations may be performed. In some implementations, cleanup operations may include additional instructions transmitted to the mobile device. For example, a device may be instructed to recover from an error condition, uninstall an application, close a webpage opened during a test, reboot, perform additional test instructions, or delete files (e.g., databases, application logs, cached data).

In some implementations, cleanup operations may include additional operations performed at the server. For example, the device may be flagged as having failed a particular test. Then, the test may be performed at a different device. If other devices are found to be capable of performing the test successfully, then the original test failure may indicate a hardware failure or other problem that is specific to the device at which the failure is detected rather than a failure in the software capabilities being tested.

FIG. 4 shows a flow diagram of a method 400 for performing a client-side mobile device test, in accordance with one implementation. In some implementations, the method 400 may be used in conjunction with the server-side mobile device test performance method 300 shown in FIG. 3 to conduct a test at a mobile device.

In some implementations, the test procedure may be defined by the developer to accomplish one or more testing objectives. For example, the test procedure may be designed to test the memory usage, rendering, performance, and user input functionality of an application running on a particular mobile device computing platform. Because the test procedure may be flexibly defined by a developer, there is no fixed method for performing a test procedure.

The operations shown in FIG. 4 depict one possible ordering of test procedure instructions. In FIG. 4, one or more actions are performed at the mobile device. Then, an assertion is made regarding a status or condition at the mobile device. If the assertion is true, then the tested behavior has functioned as expected. If instead the assertion is false, then the tested behavior has not functioned as expected, and at least a portion of the test may be considered a failure. Thus, the operations shown in FIG. 4 may be used to determine if a particular action at a mobile device results in a particular outcome.

A test procedure may include a variety of different operations as specified by the test developer. In some implementations, the types of operations that may be performed within a test procedure may include, but are not limited to: simulating a user input action by a user at the mobile device, capturing an image of the screen or a portion of the screen at the mobile device, visiting a URL with a web browser, initiating or terminating an application, providing input to or receiving output from an application, downloading and installing an application, uninstalling and deleting an application, evaluating JavaScript® or the DOM for a particular webpage, and transmitting or receiving information from a server.

At 402, an instruction to perform a test procedure is received from a test server. In some implementations, the instruction may be transmitted via operation 312 shown in FIG. 3. The test procedure may include any combination of actions to be performed at the mobile device, assertions regarding statuses or conditions at the mobile device, programming language control sequences, parameter value identifications, and other testing-related operations.

In some instances, the test procedure may be relatively simple. For example, a parameter value such as the amount of free memory at the mobile device may be determined and communicated to the test server. In other instances, the test procedure may be relatively complex. For example, a test procedure may run a complex set of actions and assertions for testing several different applications installed at the mobile device. As another example, a test procedure may run a complex set of actions and assertions for retrieving, rendering, and interacting with an interactive webpage accessible via the mobile device.

At 404, one or more actions on the mobile device are performed in accordance with the test procedure. In some implementations, the test procedure may specify an action to perform in order to determine whether the action results in an expected result. For example, the test procedure may perform an action to download and install an application in order to determine whether the application installs correctly. As another example, the test procedure may initiate an application and provide certain user input before determining whether the application is using an expected or excessive amount of memory. As yet another example, the test procedure may load a webpage corresponding to a particular URI in the web browser and compare the image displayed on the display screen of the mobile device to determine whether the webpage renders as expected. Since the developer may specify the actions to be performed within the testing procedure, any one or more actions supported by the test framework and the mobile device may be performed.

At 406, a test assertion is made regarding a status or condition at the mobile device. In some implementations, a test assertion may be used to evaluate an expected or desired state of the mobile device. In some cases, as shown in FIG. 4, a test assertion may be made after performing one or more actions on the mobile device. Alternately, a test assertion may be made before or instead of performing such actions. Because the test procedure can be designed and customized according to the intention of a test developer, test assertions may be performed at various points in a test procedure at the discretion of the test developer.

In some implementations, the test assertion may include an expression the evaluates to either true or false. The expression may include variable values that correspond to parameters, variables, statuses, or conditions at the mobile device. For instance, the expression may state that the document title in the DOM of a web page is equal to "CRM—salesforce.com." Such an expression may be represented via a programming language portion such as: "testrunner.browser.assertJavascript("document.title=='CRM—salesforce.com'"), "title didn't match expected text");". A test assertion may be evaluated by substituting the parameters, variables, statuses, or conditions of the mobile device for the variables within the test assertion's expression. In the previous example, the "document.title" variable may be substituted with the corresponding portion of the DOM in the web page loaded at the mobile device. If the expression evaluates to true after the variable substitutions, then the assertion is true. If instead the expression does not evaluate to true after the variable substitutions, then the assertion is false.

In some implementations, more than one test assertion may be made. Because the test procedure can be designed and customized according to the intention of a test developer, any type, number, and combination of test assertions permitted by the test framework may be used.

At 408, a determination may be made as to whether the test assertion is true. In some implementations, the determination may be made by analyzing the return value of the assertion made in operation 406. Each assertion may be either true or false. In some implementations, an assertion may also return another value, such as error or null, or fail to return a value. Alternately, or additionally, an assertion may throw an exception. These error situations may be treated as false or may be treated as error conditions, depending on the value returned and the instructions provided by the test developer.

In some implementations, the result of the test assertion may indicate the success or failure of the test. In some instances, a false assertion may indicate the failure of at least a portion of the test procedure. Alternately, a true assertion may indicate the success of at least a portion of the test procedure. In still other cases, the success or failure of the test procedure may depend on the result of a number of different assertions. For example, the test may be treated as a success if at least one of a series of assertions succeed but treated as a failure if none of the series of assertions succeeds. Because the test procedure can be designed and customized according to the intention of a test developer, any combination of test assertions permitted by the test framework may be used.

If a test assertion failure is detected, at 410 a determination is made as to whether the test defined by the test procedure can recover from the test failure. In some implementations, the determination made at 410 may be an explicit determination made at run-time based on factors such as the device status. For example, if the application being tested by the test procedure has not failed, then the test procedure may be able to recover from the test failure. Alternatively, the determination made at 410 may be specified by the developer during development of the test procedure. For example, the developer may specify a particular action or actions to be performed if a test assertion is false.

In some implementations, if the test cannot recover from the assertion failure, the test may terminate, and any test results may be communicated to the server. If instead the test can recover from the assertion failure, one or more error recovery operations may be performed. For example, a failed attempt to open a web page may be recovered from by closing the web browser. Even in the case of a successful test recovery, the failure of the assertion may be logged and later communicated to the server (e.g., at the end of the test).

At 412, a determination is made as to whether the test procedure includes any additional operations. The test procedure may be implemented by executing the instructions within the test procedure in sequence, subject to any control sequences such as "if", "then", "while", and "for". Thus, the determination made at 412 may depend at least in part on whether the most recently executed test instruction within the test procedure is the last test instruction within the test procedure. Because the test procedure can be designed and customized according to the intention of a test developer, any combination of test assertions, test actions, and other operations permitted by the test framework may be used in various orders and arrangements.

At 414, the test results are communicated to the test server. In some implementations, the test results may include the success or failure of any or all of the test assertions made during the performance of the test procedure. Alternately, or additionally, the test results may include secondary values deduced from the results of test assertions or identified parameter values. For example, a secondary test result value may indicate that a test portion is a success if a designated set of assertions have all succeeded.

In some implementations, test results may be communicated to the server at any time in the test procedure. As discussed herein, the ordering and selection of the particular operations shown in FIG. 4 is only an example of a type of test procedure. Because the test procedure is specified in a programming language, the selection and ordering of test procedure operations may be defined by the test developer.

In some implementations, the test results may include one or more of the parameter values identified at 208 or identified elsewhere in the test procedure. For example, the test procedure may determine new values for parameters such as available memory to determine whether and how these values have changed as a result of the test procedure. Because the test procedure can be designed and customized according to the intention of a test developer, any type of information capable of being retrieved or determined at the mobile device may be returned to the test server.

In some implementations, the test results may include one or more of text values, images such as screen captures, an ID associated with the device, and performance metrics. The performance metrics may include, but are not limited to: memory usage over time, benchmarking metrics for performing tests, processor usage over time, network requests over time, and battery usage over time.

Figure 5A:
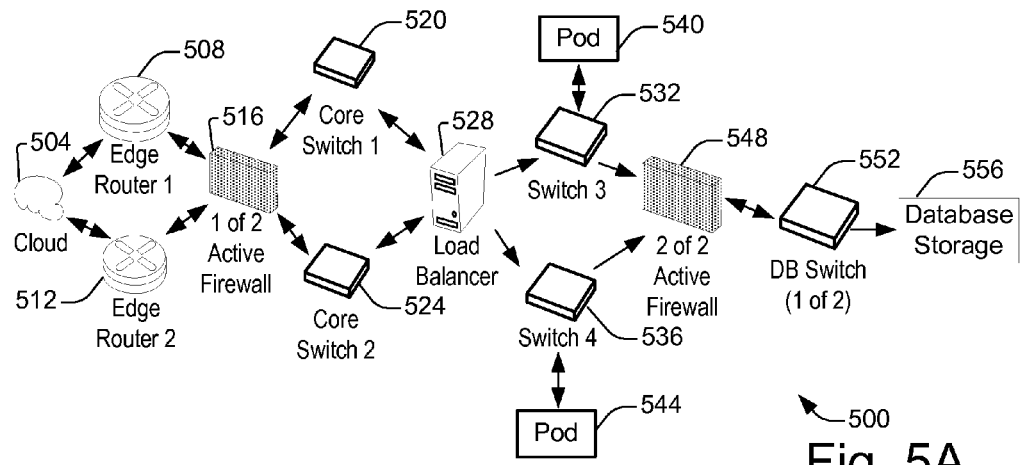
FIG. 5A shows a system diagram 500 illustrating architectural components of an on-demand service environment, in accordance with one implementation.

FIG. 5A shows a system diagram 500 illustrating architectural components of an on-demand service environment, in accordance with one implementation.

A client machine located in the cloud 504 (or Internet) may communicate with the on-demand service environment via one or more edge routers 508 and 512. The edge routers may communicate with one or more core switches 520 and 524 via firewall 516. The core switches may communicate with a load balancer 528, which may distribute server load over different pods, such as the pods 540 and 544. The pods 540 and 544, which may each include one or more servers and/or other computing resources, may perform data processing and other operations used to provide on-demand services. Communication with the pods may be conducted via pod switches 532 and 536. Components of the on-demand service environment may communicate with a database storage system 556 via a database firewall 548 and a database switch 552.

Figure 5B:
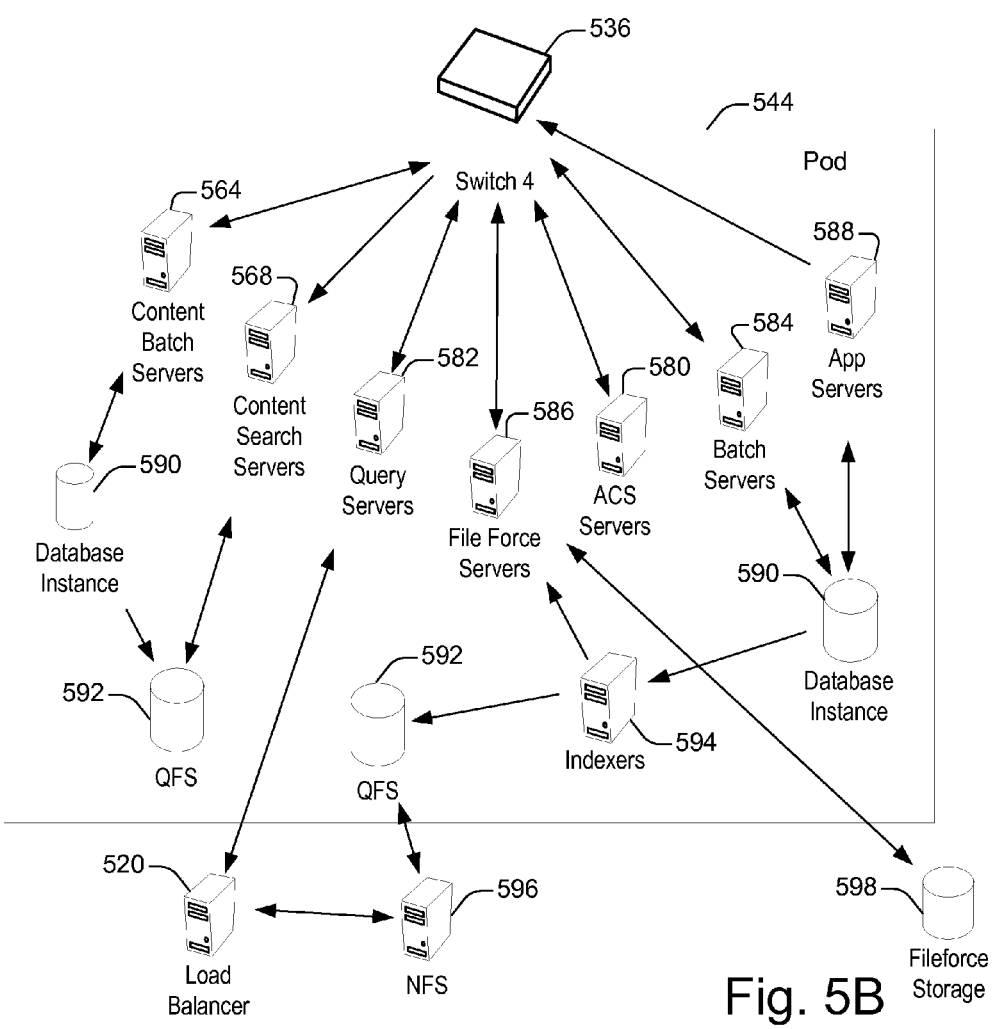
FIG. 5B shows a system diagram further illustrating architectural components of an on-demand service environment, in accordance with one implementation.

As shown in FIGS. 5A and 5B, accessing an on-demand service environment may involve communications transmitted among a variety of different hardware and/or software components. Further, the on-demand service environment 500 is a simplified representation of an actual on-demand service environment. For example, while only one or two devices of each type are shown in FIGS. 5A and 5B, some implementations of an on-demand service environment may include anywhere from one to many devices of each type. Also, the on-demand service environment need not include each device shown in FIGS. 5A and 5B, or may include additional devices not shown in FIGS. 5A and 5B.

Moreover, one or more of the devices in the on-demand service environment 500 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 504 is intended to refer to a data network or plurality of data networks, often including the Internet. Client machines located in the cloud 504 may communicate with the on-demand service environment to access services provided by the on-demand service environment. For example, client machines may access the on-demand service environment to retrieve, store, edit, and/or process information.

In some implementations, the edge routers 508 and 512 route packets between the cloud 504 and other components of the on-demand service environment 500. The edge routers 508 and 512 may employ the Border Gateway Protocol (BGP). The BGP is the core routing protocol of the Internet. The edge routers 508 and 512 may maintain a table of IP networks or 'prefixes' which designate network reachability among autonomous systems on the Internet.

In one or more implementations, the firewall 516 may protect the inner components of the on-demand service environment 500 from Internet traffic. The firewall 516 may block, permit, or deny access to the inner components of the on-demand service environment 500 based upon a set of rules and other criteria. The firewall 516 may act as one or more of a packet filter, an application gateway, a stateful filter, a proxy server, or any other type of firewall.

In some implementations, the core switches 520 and 524 are high-capacity switches that transfer packets within the on-demand service environment 500. The core switches 520 and 524 may be configured as network bridges that quickly route data between different components within the on-demand service environment. In some implementations, the use of two or more core switches 520 and 524 may provide redundancy and/or reduced latency.

In some implementations, the pods 540 and 544 may perform the core data processing and service functions provided by the on-demand service environment. Each pod may include various types of hardware and/or software computing resources. An example of the pod architecture is discussed in greater detail with reference to FIG. 5B.

In some implementations, communication between the pods 540 and 544 may be conducted via the pod switches 532 and 536. The pod switches 532 and 536 may facilitate communication between the pods 540 and 544 and client machines located in the cloud 504, for example via core switches 520 and 524. Also, the pod switches 532 and 536 may facilitate communication between the pods 540 and 544 and the database storage 556.

In some implementations, the load balancer 528 may distribute workload between the pods 540 and 544. Balancing the on-demand service requests between the pods may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548. The database firewall 548 may act as a computer application firewall operating at the database application layer of a protocol stack. The database firewall 548 may protect the database storage 556 from application attacks such as structure query language (SQL) injection, database rootkits, and unauthorized information disclosure.

In some implementations, the database firewall 548 may include a host using one or more forms of reverse proxy services to proxy traffic before passing it to a gateway router. The database firewall 548 may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, communication with the database storage system 556 may be conducted via the database switch 552. The multi-tenant database system 556 may include more than one hardware and/or software components for handling database queries. Accordingly, the database switch 552 may direct database queries transmitted by other components of the on-demand service environment (e.g., the pods 540 and 544) to the correct components within the database storage system 556.

In some implementations, the database storage system 556 is an on-demand database system shared by many different organizations. The on-demand database system may employ a multi-tenant approach, a virtualized approach, or any other type of database approach. An on-demand database system is discussed in greater detail with reference to FIGS. 6 and 7.

FIG. 5B shows a system diagram illustrating the architecture of the pod 544, in accordance with one implementation. The pod 544 may be used to render services to a user of the on-demand service environment 500.

In some implementations, each pod may include a variety of servers and/or other systems. The pod 544 includes one or more content batch servers 564, content search servers 568, query servers 572, file force servers 576, access control system (ACS) servers 580, batch servers 584, and app servers 588. Also, the pod 544 includes database instances 590, quick file systems (QFS) 592, and indexers 594. In one or more implementations, some or all communication between the servers in the pod 544 may be transmitted via the switch 536.

In some implementations, the application servers 588 may include a hardware and/or software framework dedicated to the execution of procedures (e.g., programs, routines, scripts) for supporting the construction of applications provided by the on-demand service environment 500 via the pod 544. Some such procedures may include operations for providing the services described herein.

The content batch servers 564 may requests internal to the pod. These requests may be long-running and/or not tied to a particular customer. For example, the content batch servers 564 may handle requests related to log mining, cleanup work, and maintenance tasks.

The content search servers 568 may provide query and indexer functions. For example, the functions provided by the content search servers 568 may allow users to search through content stored in the on-demand service environment.

The Fileforce servers 576 may manage requests information stored in the Fileforce storage 578. The Fileforce storage 578 may store information such as documents, images, and basic large objects (BLOBs). By managing requests for information using the Fileforce servers 576, the image footprint on the database may be reduced.

The query servers 572 may be used to retrieve information from one or more file systems. For example, the query system 572 may receive requests for information from the app servers 588 and then transmit information queries to the NFS 596 located outside the pod.

The pod 544 may share a database instance 590 configured as a multi-tenant environment in which different organizations share access to the same database. Additionally, services rendered by the pod 544 may require various hardware and/or software resources. In some implementations, the ACS servers 580 may control access to data, hardware resources, or software resources.

In some implementations, the batch servers 584 may process batch jobs, which are used to run tasks at specified times. Thus, the batch servers 584 may transmit instructions to other servers, such as the app servers 588, to trigger the batch jobs.

In some implementations, the QFS 592 may be an open source file system available from Sun Microsystems® of Santa Clara, Calif. The QFS may serve as a rapid-access file system for storing and accessing information available within the pod 544. The QFS 592 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 568 and/or indexers 594 to identify, retrieve, move, and/or update data stored in the network file systems 596 and/or other storage systems.

In some implementations, one or more query servers 572 may communicate with the NFS 596 to retrieve and/or update information stored outside of the pod 544. The NFS 596 may allow servers located in the pod 544 to access information to access files over a network in a manner similar to how local storage is accessed.

In some implementations, queries from the query servers 522 may be transmitted to the NFS 596 via the load balancer 520, which may distribute resource requests over various resources available in the on-demand service environment. The NFS 596 may also communicate with the QFS 592 to update the information stored on the NFS 596 and/or to provide information to the QFS 592 for use by servers located within the pod 544.

In some implementations, the pod may include one or more database instances 590. The database instance 590 may transmit information to the QFS 592. When information is transmitted to the QFS, it may be available for use by servers within the pod 544 without requiring an additional database call.

In some implementations, database information may be transmitted to the indexer 594. Indexer 594 may provide an index of information available in the database 590 and/or QFS 592. The index information may be provided to file force servers 576 and/or the QFS 592.

FIG. 6 shows a block diagram of an environment 610 wherein an on-demand database service might be used, in accordance with one implementation.

Environment 610 includes an on-demand database service 616. User system 612 may be any machine or system that is used by a user to access a database user system. For example, any of user systems 612 can be a handheld computing device, a mobile phone, a laptop computer, a work station, and/or a network of computing devices. As illustrated in FIGS. 6 and 7, user systems 612 might interact via a network 614 with the on-demand database service 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 616" and "system 616" will be used interchangeably herein. A database image may include one or more database objects. A relational database management system (RDBMS) or the equivalent may execute storage and retrieval of information against the database object(s). Application platform 618 may be a framework that allows the applications of system 616 to run, such as the hardware and/or software, e.g., the operating system. In an implementation, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

The users of user systems 612 may differ in their respective capacities, and the capacity of a particular user system 612 might be entirely determined by permissions (permission levels) for the current user. For example, where a call center agent is using a particular user system 612 to interact with system 616, the user system 612 has the capacities allotted to that call center agent. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 616, shown in FIG. 6, implements a web-based customer relationship management (CRM) system. For example, in one implementation, system 616 includes application servers configured to implement and execute CRM software applications as well as provide related data, code, forms, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 616 implements applications other than, or in addition to, a CRM application. For example, system 616 may provide tenant access to multiple hosted (standard and custom) applications. User (or third party developer) applications, which may or may not include CRM, may be supported by the application platform 618, which manages creation, storage of the applications into one or more database objects and executing of the applications in a virtual machine in the process space of the system 616.

Each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614.

Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 616 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one implementation, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also shows a block diagram of environment 610 further illustrating system 616 and various interconnections, in accordance with one implementation. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other implementations, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of processors. Memory system 612B may be any combination of one or more memory devices, short term, and/or long term memory. Input system 612C may be any combination of input devices, such as keyboards, mice, trackballs, scanners, cameras, and/or interfaces to networks. Output system 612D may be any combination of output devices, such as monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as Oracle™ databases.

Application platform 618 includes an application setup mechanism 738 that supports application developers' creation and management of applications, which may be saved as metadata into tenant data storage 622 by save routines 736 for execution by subscribers as tenant process spaces 704 managed by tenant management process 710 for example. Invocations to such applications may be coded using PL/SOQL 34 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, other transport protocols may be used to optimize the system depending on the network interconnect used.

In certain implementations, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one implementation, therefore, an interface system implementing a load balancing function (e.g., an F5 Big-IP load balancer) is communicably coupled between the application servers 700 and the user systems 612 to distribute requests to the application servers 700. In one implementation, the load balancer uses a least connections algorithm to route user requests to the application servers 700. Other examples of load balancing algorithms, such as round robin and observed response time, also can be used. For example, in certain implementations, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each call center agent uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain implementations, user systems 612 (which may be client machines/systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method of testing a device, the method comprising:
receiving, at a server, a request to perform a test instruction on one or more of a plurality of devices in communication with the server via a network, the test instruction being written in accordance with a computer programming language, the test instruction configured to test an application or capability associated with the one or more devices, the computer programming language capable of being translated into a plurality of different programming language instructions sets;
selecting a first one of the plurality of devices, the first device being capable of performing instructions written in a first one of the computer programming language instruction sets;
transmitting the test instruction to the first device via the network, the first device being configured to translate the test instruction from the computer programming language to the first computer programming language instruction set; and
receiving a response message from the first device, the response message comprising a result of an attempt to perform the test instruction at the first device.

2. The method recited in claim 1, wherein each of the plurality of devices implements a respective computing platform, and wherein each computing platform comprises a respective set of operations capable of being performed by the device.

3. The method recited in claim 2, wherein each computing platform further comprises a respective one of the computer programming language instruction sets, and wherein each of the computer programming language instruction sets includes instructions capable of initiating selected ones of the operations in the respective computing platform.

4. The method recited in claim 1, wherein a second one of the devices is capable of performing instructions written in a second one of the computer programming language instruction sets, and wherein the computer programming language is capable of being translated into the second computer programming language instruction set.

5. The method recited in claim 1, the method further comprising:
identifying one or more parameters for selecting the first device, the one or more parameters defining characteristics of devices for which the test instruction is applicable.

6. The method recited in claim 5, the method further comprising:
determining whether the first device satisfies the identified one or more parameters.

7. The method recited in claim 1, the method further comprising:
storing an indication of the received response message on a storage medium accessible to the test server.

8. The method recited in claim 1, wherein the first device is a mobile computing device configured to communicate via a cellular data network.

9. The method recited in claim 1, wherein test instruction is configured to test a web-based on-demand computing service provided to the first device by an on-demand computing services environment accessible via the network.

10. The method recited in claim 1, wherein test instruction is configured to test a native application for accessing an on-demand computing service provided to the first device by an on-demand computing services environment accessible via the network.

11. The method recited in claim 1, the method further comprising:
storing information regarding the first device in a multi-tenant database storage system accessible to the server.

12. A system comprising:
a server in communication with a plurality of devices via a network, the server being configured to:
receive a request to perform a test instruction on one or more of the plurality of devices, the test instruction being written in accordance with a computer programming language, the test instruction configured to test an application or capability associated with the one or more devices, the computer programming language capable of being translated into a plurality of different programming language instructions sets;

selecting a first one of the plurality of devices, the first device being capable of performing instructions written in a first one of the computer programming language instruction sets;

transmitting the test instruction to the first device via the network, the first device being configured to translate the test instruction from the computer programming language to the first computer programming language instruction set; and receiving a response message from the first device, the response message comprising a result of an attempt to perform the test instruction at the first device.

13. The system recited in claim 12, wherein each of the plurality of devices implements a respective computing platform, and wherein each computing platform comprises a respective set of operations capable of being performed by the device.

14. The system recited in claim 13, wherein each computing platform further comprises a respective one of the computer programming language instruction sets, and wherein each of the computer programming language instruction sets includes instructions capable of initiating selected ones of the operations in the respective computing platform.

15. The system recited in claim 12, wherein a second one of the devices is capable of performing instructions written in a second one of the computer programming language instruction sets, and wherein the computer programming language is capable of being translated into the second computer programming language instruction set.

16. The system recited in claim 12, wherein the server is further configured to:
identify one or more parameters for selecting the first device, the one or more parameters defining characteristics of devices for which the test instruction is applicable.

17. The system recited in claim 16, wherein the server is further configured to:
determine whether the first device satisfies the identified one or more parameters.

18. The system recited in claim 12, wherein the server is further configured to:
store an indication of the received response message on a storage medium accessible to the test server.

19. The system recited in claim 12, wherein the first device is a mobile computing device configured to communicate via a cellular data network.

20. One or more non-transitory computer readable media having instructions stored thereon for performing a method of testing a device, the method comprising:

receiving, at a server, a request to perform a test instruction on one or more of a plurality of devices in communication with the server via a network, the test instruction being written in accordance with a computer programming language, the test instruction configured to test an application or capability associated with the one or more devices, the computer programming language capable of being translated into a plurality of different programming language instructions sets;

selecting a first one of the plurality of devices, the first device being capable of performing instructions written in a first one of the computer programming language instruction sets;

transmitting the test instruction to the first device via the network, the first device being configured to translate the test instruction from the computer programming language to the first computer programming language instruction set; and receiving a response message from the first device, the response message comprising a result of an attempt to perform the test instruction at the first device.

21. The one or more non-transitory computer readable media recited in claim 20, wherein each of the plurality of devices implements a respective computing platform, and wherein each computing platform comprises a respective set of operations capable of being performed by the device.

22. The one or more non-transitory computer readable media recited in claim 21, wherein each computing platform further comprises a respective one of the computer programming language instruction sets, and wherein each of the computer programming language instruction sets includes instructions capable of initiating selected ones of the operations in the respective computing platform.

23. The one or more non-transitory computer readable media recited in claim 20, wherein a second one of the devices is capable of performing instructions written in a second one of the computer programming language instruction sets, and wherein the computer programming language is capable of being translated into the second computer programming language instruction set.

24. The one or more non-transitory computer readable media recited in claim 20, the method further comprising:
identifying one or more parameters for selecting the first device, the one or more parameters defining characteristics of devices for which the test instruction is applicable.

* * * * *

UNITED STATES PATENT AND TRADEMARK OFFICE
CERTIFICATE OF CORRECTION

PATENT NO. : 8,566,648 B2  
APPLICATION NO. : 13/104784  
DATED : October 22, 2013  
INVENTOR(S) : Jason A. Schroeder Page 1 of 1

It is certified that error appears in the above-identified patent and that said Letters Patent is hereby corrected as shown below:

Title Page:

Item 73 in the "Assignee" section, change "salesforce, inc." to --salesforce.com, inc.--.

Signed and Sealed this  
Twenty-fourth Day of December, 2013

Margaret A. Focarino  
*Commissioner for Patents of the United States Patent and Trademark Office*